United States Patent [19]

Wagner

[11] Patent Number: 4,889,322
[45] Date of Patent: Dec. 26, 1989

[54] POST BRACE APPARATUS AND SYSTEM

[75] Inventor: Kenneth A. Wagner, Rio Rico, Ariz.

[73] Assignee: Product Concepts, Inc., Rio Rico, Ariz.

[21] Appl. No.: 256,451

[22] Filed: Oct. 12, 1988

[51] Int. Cl.⁴ .................... E04H 12/22; E04H 12/20
[52] U.S. Cl. ........................................ 256/36; 256/56; 256/64; 256/70; 403/172; 403/176; 403/205; 403/235; 403/403; 52/149; 52/150
[58] Field of Search .............. 403/191, 235, 172, 176, 403/233, 403, 205; 256/64, 65, 68, 70, 35, 36, 10, 66, 47, 54; 52/150, 149

[56] References Cited

U.S. PATENT DOCUMENTS

| | | | |
|---|---|---|---|
| 261,727 | 7/1882 | Kimball | 256/35 |
| 619,684 | 2/1899 | Emerton et al. | 256/55 X |
| 1,165,459 | 12/1915 | Sprague | 52/150 |
| 1,221,481 | 4/1917 | Selway | 52/150 |
| 1,330,808 | 2/1920 | James | 256/47 X |
| 3,760,468 | 6/1972 | Cordell, Sr. | 52/298 |
| 3,820,758 | 6/1974 | Berg, Jr. et al. | 256/10 |
| 3,874,640 | 4/1975 | Wagner et al. | 256/47 |
| 4,077,611 | 3/1978 | Wilson | 256/10 |
| 4,763,879 | 8/1988 | Wasicek | 256/70 X |

FOREIGN PATENT DOCUMENTS 598417 2/1948 United Kingdom ................ 256/64

Primary Examiner—Randolph A. Reese
Assistant Examiner—Franco S. DeLiquori
Attorney, Agent, or Firm—LaValle D. Ptak

[57] ABSTRACT

A bracing system is disclosed which is particularly suitable for providing line and end corner bracing for "T-post" fence construction. The bracing system comprises slidable collars which are positioned over the posts and located vertically between the lugs at a desired location. A wedging arrangement is used to secure the collar between adjacent lugs on the posts, and the collar has provisions for accepting accessories to permit a rigid cross-brace, typically also another "T-post", to be inserted therebetween for providing rigid cross-bracing between adjacent "T-posts" of the fence. Accessories also are disclosed to adapt the posts for uses other than fences.

24 Claims, 3 Drawing Sheets

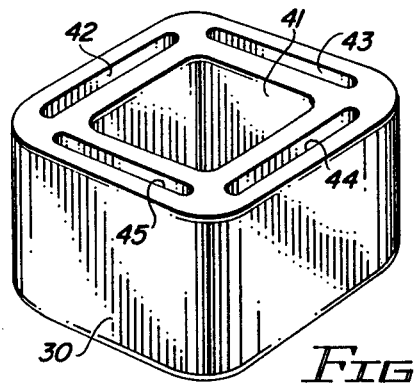
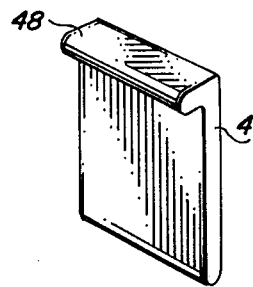
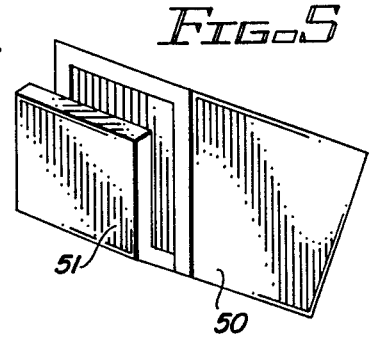
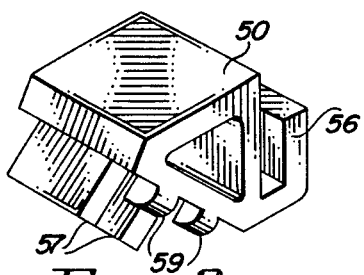
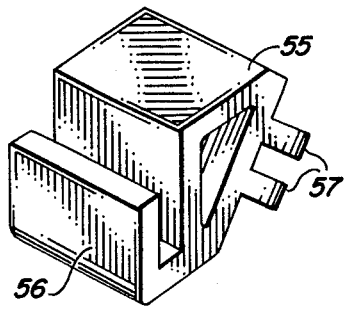
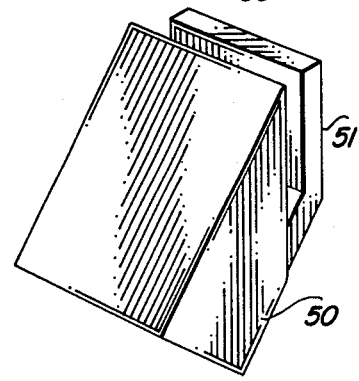
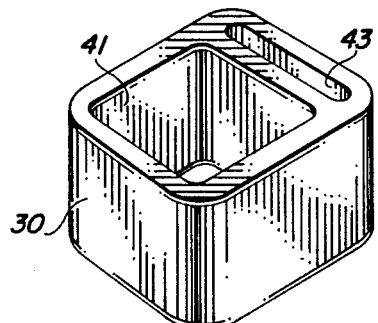
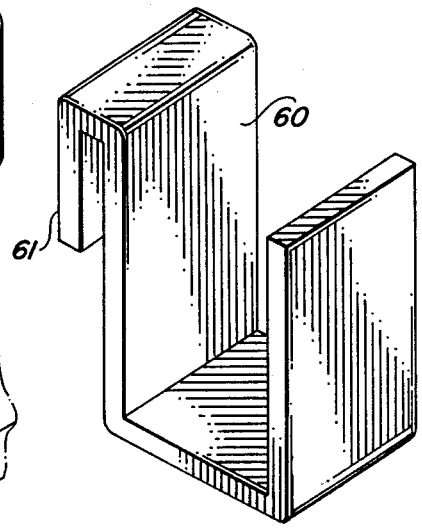
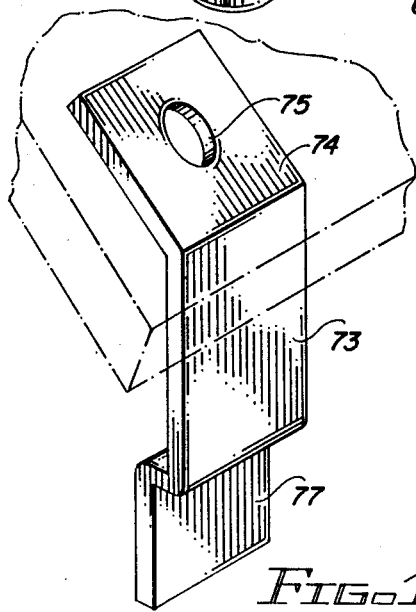
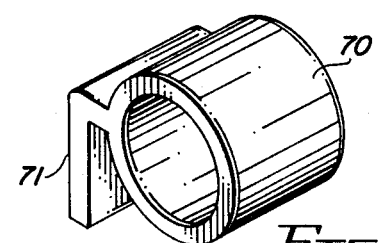

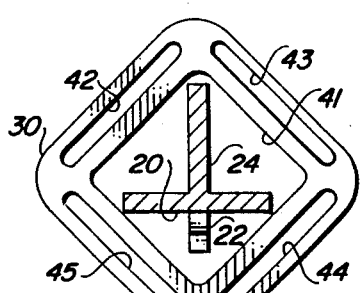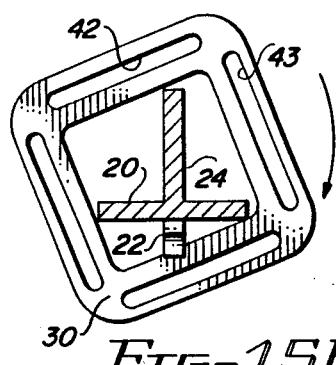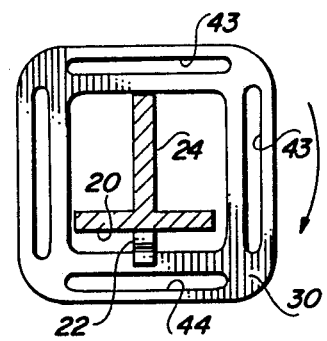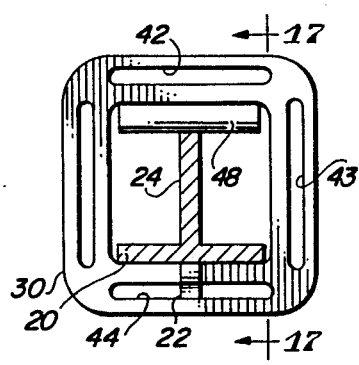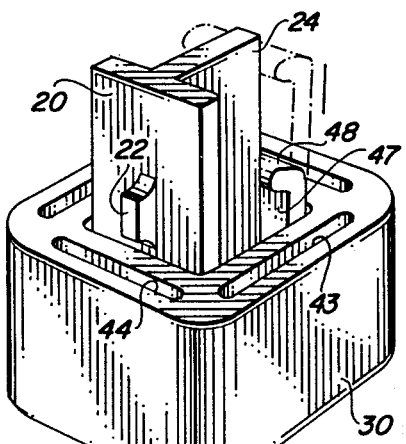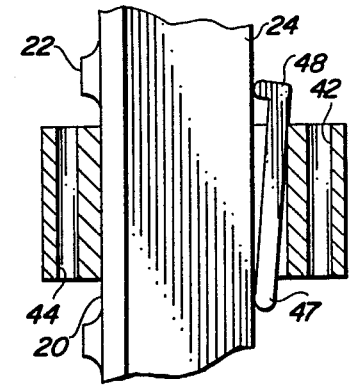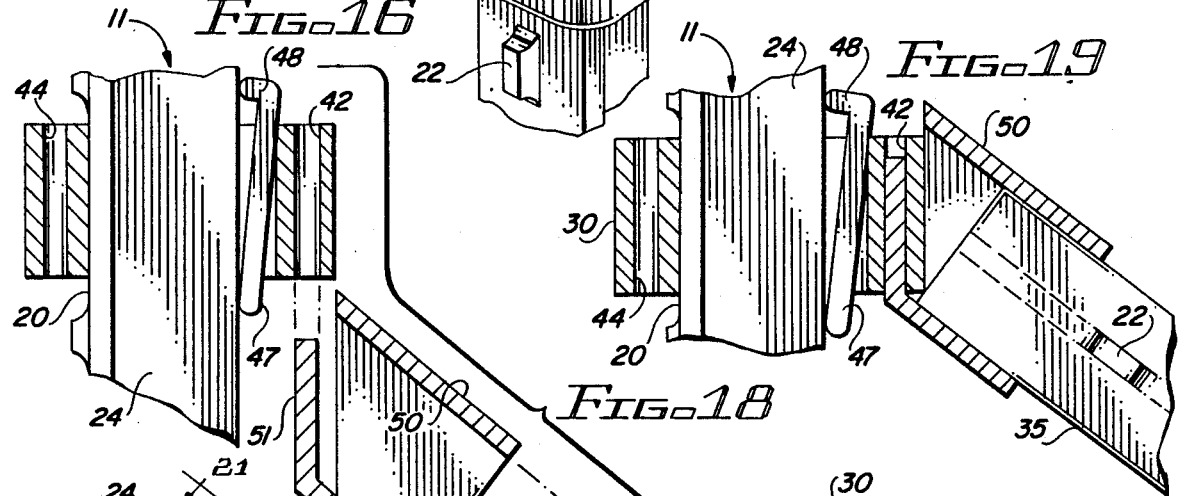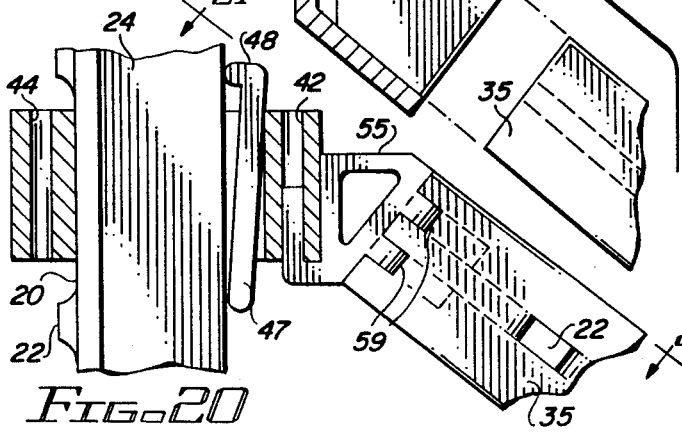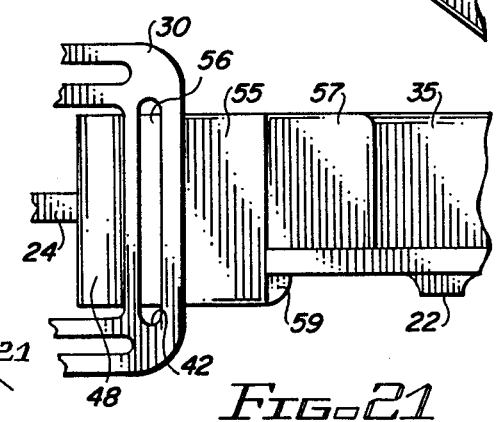

4,889,322

POST BRACE APPARATUS AND SYSTEM

BACKGROUND

Fence posts are widely used in the construction of fences for a variety of purposes such as animal management, property boundaries, snow barriers and the like. A popular type of fence post is made of steel and has a T-shaped cross-section, commonly called "T-posts". The flat vertical face has a spaced series of lugs or projections extending in a line opposite the rear or "leg" portion of the T cross-section. These lugs then are used to facilitate the attachment of wire (usually barbed wire), which is stretched along the posts and secured at intervals to braced line posts and corner posts. Bracing for the line posts and corner posts must be solid if the fence wire is to maintain its tension over a period of time.

The shape of metal T-posts does not facilitate simple attachment of braces with common hardware. Usually, the posts in a fence system which require braces are made from angle iron. Bracing of such posts is slow and cumbersome, since normally an angle iron brace is secured to the angle iron post with makeshift hardware. Frequently, a hole must be drilled through the post to secure the brace. Since fences of this type frequently are located substantial distances from household power sources, portable generators or battery operated tools are necessary. Conventional bracing also typically secures the opposite or lower end of the brace in the soil, either with driven stakes or poured concrete. It is readily apparent that the bracing of T-posts in this manner is inefficient and costly.

Devices have been developed for attachment to a T-post which clip onto the posts through a type of spring action or which are secured to the posts by means of threaded fasteners. Two patents disclosing devices for permitting the subsequent mounting of electric fence wire on metal T-posts are the Patents to Burg #3,820,758 and Wilson #4,077,611. Both of these patents disclose a clip-on member made of insulating material which snaps over the post and is held in place by friction. Since the devices of both of these patents include a portion which rests on the post between the positioning lugs, vertical movement of the mounting device is restricted by the lugs located above and below the device.

The Patent to Wagner #3,874,640 discloses an attachment for placement on a T-post between adjacent lugs which facilitates the handling or tensioning of barbed wire, so that the wire may be stretched first and then raised out of the device and attached to the fence post. This is a temporary guide which is secured to the post only during the time the wire tensioning operation is effected.

The Patent to Cordell #3,670,468 is directed to a wedge for removably securing and aligning a T-post inside a larger pipe for use in temporary fencing. The T-post loosely fits within the pipe, and the wedge then holds it in place vertically within the pipe until removal of the wedge permits subsequent removal of the post. A substantial length of the post, including the positioning lugs on the front is enclosed within the pipe at the bottom end of the post.

It is desirable to provide a simple and efficient apparatus and system for field installation for facilitating the bracing of T-posts used in a fence system and for mounting accessories on such posts.

SUMMARY OF THE INVENTION

It is an object of this invention to provide improved apparatus for bracing T-posts.

It is another object of this invention to provide a simple and efficient hardware system for use in bracing T-post fences.

It is an additional object of this invention to provide a T-post bracing system, which employs a conventional T-post as the bracing element secured to two other T-posts by means of simple attaching collars.

A further object of this invention is to provide a T-post hardware and bracing system in which the various hardware components may be quickly and effectively mounted, assembled, and disassembled with standard hand tools.

It is still another object of this invention to provide hardware for mounting various accessories on a standard T-post to adapt such a T-post for a variety of uses.

In a preferred embodiment of the invention, a post brace system is used to attach a brace between first and second spaced vertical posts. A first collar is releasably mounted on the first post and the second collar is releasably mounted on the second post. A rigid cross-brace member is releasably secured at opposite ends to the first and second collars to cause the cross-brace member to extend between the first and second collars.

In a more specific embodiment of the invention, the post brace system is used for bracing first and second spaced-apart T-posts. A collar with one or more enclosed slots in it is secured between the lugs of a T-post by means of a wedge. The slots in the collar are used to receive attachment members, such as sockets for the cross-brace member. The collars are held captive between the lugs of the vertical T-posts and cannot slide vertically along the posts, so long as the wedge is in place.

Brief Description of the Drawings

FIGS. 3 and 4 are perspective views of two components used together in conjunction with a preferred emboidment of the invention;

FIGS. 5 and 6 are front and rear perspective views of an accessory used in conjunction with the embodiment of the invention shown in FIGS. 1, 2 and 3;

FIGS. 7 and 8 illustrate an alternative to the apparatus of FIGS. 5 and 6 which may be used in conjunction with the embodiment of FIGS. 1, 2 and 3;

FIG. 9 shows an alternative version of the embodiment of FIG. 3;

FIGS. 10 through 14 illustrate accessories which may be used with either of the embodiments of FIGS. 3 and 9;

FIGS. 15A through 15D are a top view illustrating the manner of installation of the device of FIG. 3 on a conventional T-post;

FIG. 16 is an enlarged perspective view showing the installation of the device of FIG. 3 on a T-post;

FIG. 17 is a cross-sectional view taken along the line 17—17 of FIG. 15D;

FIG. 18 is a partially exploded view showing the manner of installation of the device of FIG. 5 and a support brace into the apparatus illustrated in cross-section in FIG. 17;

FIG. 19 shows the completed assembly of the exploded device of FIG. 18;

FIG. 20 is a cross-sectional view similar to that of FIG. 19, but using the device of FIG. 7; and FIG. 21 is a top view taken along the line 21—21 of FIG. 20.

Detailed Description

Figure 1:
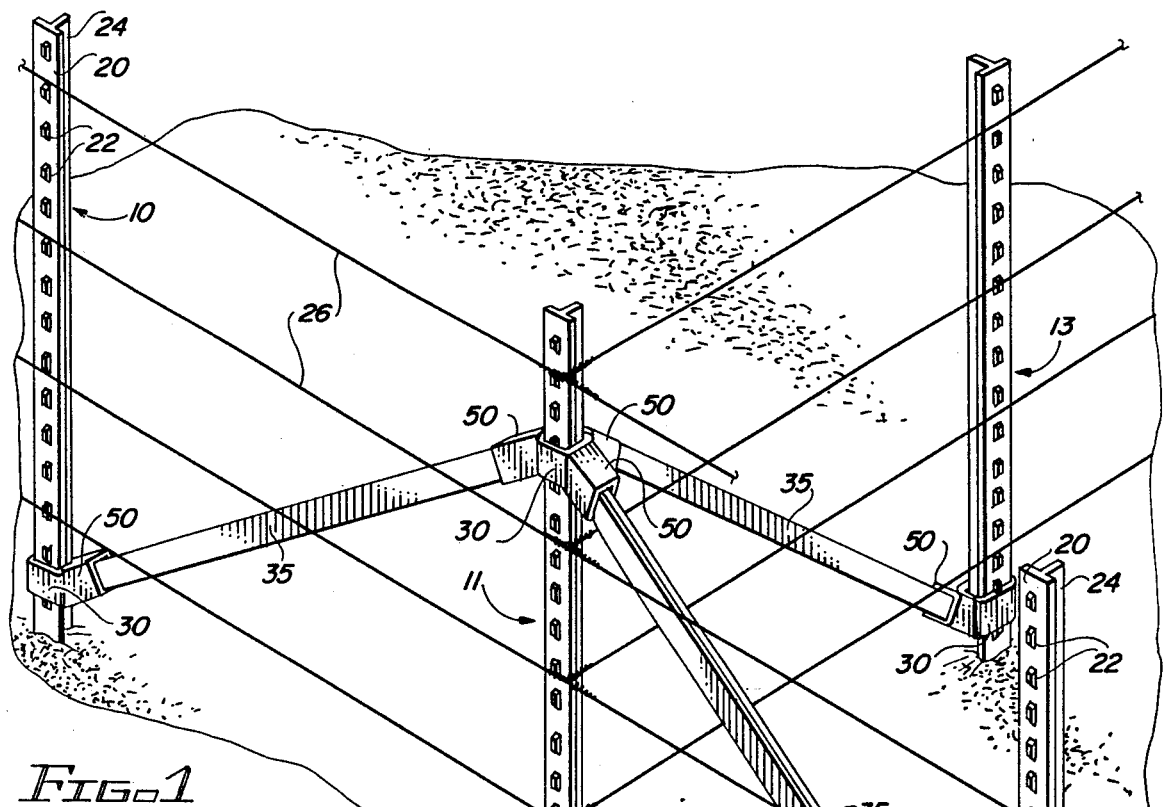
FIG. 1 is a perspective view of a portion of a fence illustrating a preferred embodiment of the invention.

Reference now should be made to the drawings in which the same reference numbers are used throughout the different figures to designate the same components. FIG. 1 illustrates a portion of a typical fence construction, showing a three-way corner. Four "T-post" fence posts 10, 11, 12 and 13 are shown in the portion of the fence illustrated. Each of these posts includes a front face 20 having a vertical row of spaced lugs 22 on it. This face is attached to a rear leg 24, and the junction of the rear surface of the front face 20 and the rear leg 24 forms the "T" configuration for which such posts are named. The posts 10, 11 and 12 are illustrated in a typical spaced-apart relationship used for a fence line. The post 13 is aligned with the post 11 for a fence line which is perpendicular to the one consisting of the posts 10, 11 and 12. Thus, the post 11 is a corner post. Wires 26, usually barbed wire, are strung between the posts to form the fence. Since the portion which is illustrated in Figure 1 is at a corner, the posts 10, 12 and 13 are located closer to the post 11 than the normal post to post spacing used along the length of the fence. These posts, however, could be located at the usual spacing, if desired.

To brace the installation of FIG. 1 in accordance with the teachings of this invention, collars 30, having an internal rectangular opening in them are slipped over the tops of each of the posts 10, 11, 12 and 13. These collars have an internal opening of sufficient size to permit them to be moved to any desired vertical location along the posts 10 through 13. As illustrated, the collars on the posts 10, 12 and 13, are placed near the bottoms of these posts, while the collar 30 on the post 11 is shown located near the top of that post.

Once the desired location for a collar 30 is determined, the collar 30 is secured to the post in a manner described subsequently so that it does not move vertically on the post. Each of the collars 30, also has a provision for releasably attaching a brace socket 50, as illustrated in FIG. 1. The brace sockets 50 each have an opening in them to receive one end of a rigid cross-brace 35. The sockets 50 may be placed over the ends of the cross-brace 35 prior to securing the holders 50 on the collars 30, or the holders may be secured to the collars before inserting the cross-brace 35. In accordance with the preferred embodiment, all of the parts simply slip together without requiring any additional fasteners.

Once all of the collars 30, brace holders 50, and braces 35 are in position, the post with the collar 30 located near its upper end (post 11 in FIG. 1) may be driven downwardly into the ground an additional short distance to rigidly secure all of the components together. Consequently, the cross-bracing is obtained without requiring any drilling of holes, welding, cutting of parts or driving of threaded fasteners and the like. The bracing structure which is provided is effective and rigid and prevents the corner from being pulled in any of the three directions by the tension of the wire which is strung between the various posts.

Figure 2:
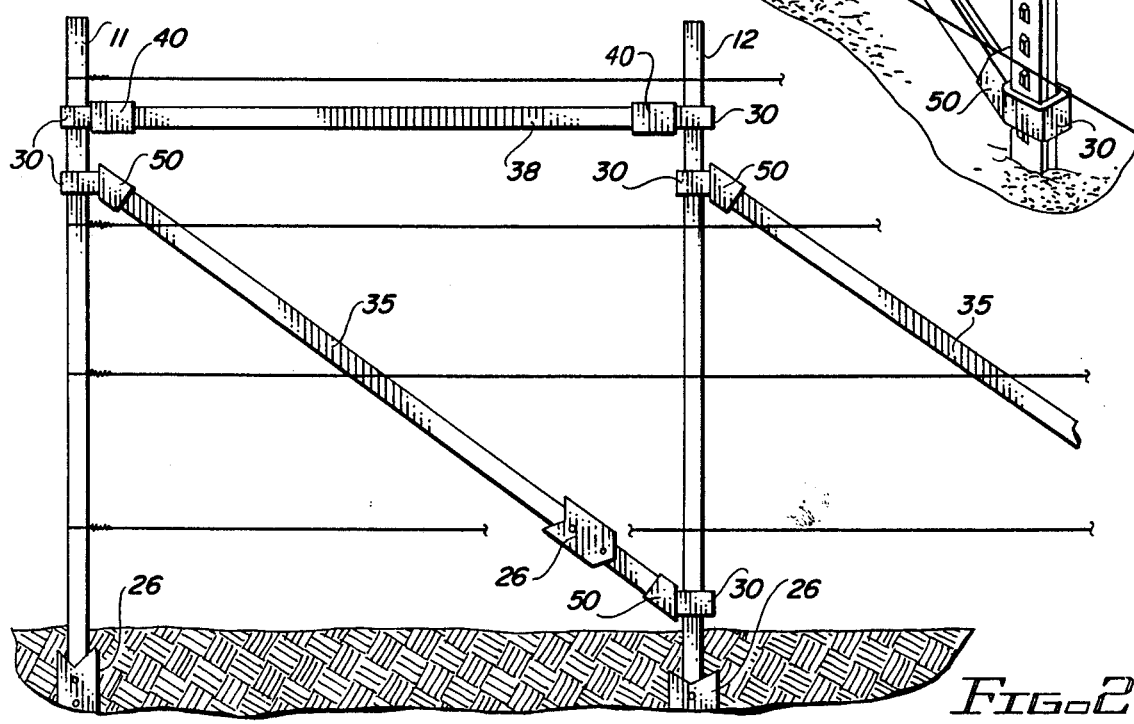
FIG. 2 is a side view of a fence construction illustrating features of a preferred embodiment of the invention.

FIG. 2 is a side view of the arrangement of the braces and posts used for a typical line post bracing arrangement, which differs slightly from the line post bracing provided between the posts 10, 11 and 12 of FIG. 1. In FIG. 2 the posts 11 and 12 and the collars 30, brace sockets 50 and rigid brace 35 are illustrated in the same position they occupy in FIG. 1. In addition, however, a second collar 30 is provided on the post 11 located above the lower collar 30; and second and third collars 30 are provided near the top end of the post 12. The uppermost collars 30 have a pair of brace sockets 40 attached to them with a horizontal brace extending between the brace sockets 40, so that additinal bracing is provided between the posts 11 and 12 to form a triangular brace consisting of the cross-brace members 35 and 38 along with the attachments to the posts 11 and 12. The intermediate collar 30 is used for securing a brace socket 50 for the end of a brace 35 extending to the right to the next post (not shown) in the fence.

FIG. 2 also illustrates the conventional T-post lower guide 26 which is driven into the ground on the posts 11 and 12. In addition, FIG. 2 illustrates the manner in which a standard length T-post 35 is inserted into the brace sockets 50 attached to the lower ones of the collars 30 on both of the posts 11 and 12.

To install the brace configuration shown in FIG. 2. The post 11 first is driven into the earth in the desired position. The post 12 then also is driven in alignment with the post 11 such that the distance between the posts 11 and 12 is approximately one (1) foot less than the length of the T-post 35 which is to be used for the cross-brace. The collar 30 then is mounted on the post 11 near its upper end, as shown. The socket 50 next is secured to the collar 30. Another collar 30 (with a socket 50) is mounted on the poast 12, and this collar is located near the place where the post 12 enters the ground.

The middle collar 30 on the post 12 is then secured in place as shown and finally, the upper collars 30 on both of the posts 11 and 12 are secured in place. These two upper collars are located on a line which is substantially horizontal, as illustrated in FIG. 2. An upper brace 38, which may be cut to length from a standard T-post, is inserted into the pair of sockets 40 which then are attached to the upper collars 30. Similarly, the T-post brace 35 (FIG. 2) is inserted into the pair of sockets 50 which are attached to the collars 30, in a manner subsequently to be described.

The sockets 40 and 50 may be attached first to the corresponding cross-braces or they may be attached to the respective collars 30 first, with the brace-post members 35 and 38 then inserted subsequent to the collar placement. If this latter approach is taken, the post 12 is flexed away from the post 11 to permit placement of the ends of the brace-post member 35 into the sockets 50 and the ends of the brace-post 38 into the sockets 40. The post 12 then is returned to its vertical position and the fence is strung with wire placed under tension. The brace-post members 35 and 38 are held in place at both ends by the sockets 50 and 40. The rigid structural triangles which are formed by the posts 11, 35 and 12 and by the posts 12, 35 and 38, provide the necessary rigidity to prevent displacement of the post 11.

If the earth in which the fence posts are placed is relatively hard, the cross-post brace 38 and its associated hardware may be ommitted. For soft earth, however, this additional cross-post bracing provides additional necessary resistance to displacement of the post 11 resulting from the tension of the wire during the fence installation and subsequently. It should be noted that after the cross-brace member 35 (or members 35 and 38) are put in place, the post 11 may be driven downwardly into the ground a short distance to tighten all of the brace connections. This procedure may be used at any point in the fence construction to tighten any lose brace connections which remain after installation of the various portions of the post-brace system. Absolute tightness, however, is not essential since all of the various connections tighten during the wire stretching which occurs during the installation of the fence.

Reference now should be made to FIGS. 3 and 4, which illustrate the details of the collars 30 described generally in conjunction with FIGS. 1 and 2. FIG. 3 shows a preferred embodiment of the collar 30 of the invention which permits the mounting of various hardware components onto a T-post, such as the posts 11 through 13 of FIGS. 1 and 2. The collar 30 has a rectangular (preferably square) longitudinal internal opening 41 through it. In addition, each side of the collar includes an elongated rectangular slot 42, 43, 44, or 45 through it parallel to the longitudinal axis of the collar and parallel to the inner surfaces of the opening 41. The slots 42 through 45 pass entirely through the thickness or longitudinal dimension of the collar 30. A second portion of the collar assembly comprises a simple L-shaped camming wedge consisting of a downward extension 47 and a top plate 48 oriented at right angles to the extension 47. As illustrated in FIG. 4, the wedge essentially has an inverted L-shaped configuration, where the leg of the L formed by the portion 48 is substantially shorter than the downwardly depending portion 47.

Reference now should be made to FIGS. 15 through 17 which illustrate the manner in which the collar 30 is placed on a T-post and securely held in place by the wedge of FIG. 4. In FIG. 15A, the collar is shown in position to be moved downwardly over the top of a T-post after the T-post has been driven into the ground. The distance between opposite internal walls of the opening 41 is selected to be slightly greater than the overall front to back distance of the T-post between the rear surface of the leg 24 to the outermost projection of the lugs 22. The face 20 of a conventional T-post typically is not as wide as this front-to-back dimension. Consequently, the collar 30 readily may be slipped into place and moved to any desired vertical location on the T-post, as shown in FIG. 15A.

When the desired location is found, the collar 30 is rotated approximately 45°, as shown in FIGS. 15B and 15C, to provide the orientation illustrated. Then the collar 30 is pushed toward the front surface of the front face 20 to cause the inside wall of the opening 41 which faces that surface to engage the front face 20. This is shown in FIG. 15D.

To hold the collar 30 in place on the post, the wedge 47/48 is placed behind the edge of the leg 24, between that edge and the opposite internal surface of the opening 41. The wedge then is driven downwardly into place, as shown in FIG. 16, to tightly wedge the collar 30 and the T-post together. This engaged configuration is shown most clearly in FIGS. 15D through 17. It is readily apparent from an examination of FIGS. 16 and 17 that the adjacent lugs 22 which are located immediately above and below the collar 30 prevent or significantly limit vertical movement of the collar 30 on the T-post once it has been secured in place by the wedge 47/48, as shown in FIG. 16. FIG. 17 illustrates the cross-sectional orientation of the various parts when the collar 30 is secured in place by a sharp blow on the surface 48 of the wedge. Thus, the collar is easily secured in place with a standard fencing tool or a hammer. No other tools are necessary.

FIGS. 5 and 6 illustrate a preferred embodiment of a hollow brace socket 50 which has an angled tongue 51 extending from it. Front and rear perspective views are provided in FIGS. 5 and 6.

FIGS. 18 and 19 show the manner in which the brace socket 50 is secured to the collar 30 in the upper position, such as shown on the post 11 of FIG. 1 for the collar of FIG. 1. To accomplish this, the brace socket 50 is oriented as shown in FIGS. 5 and 6 and the tongue 51 is inserted into the slot 42 from the bottom, as indicated in FIG. 18. The angle of the brace 50 is selected to correspond to the desired angle of the cross-brace 35 between the posts 11 and 13 of FIG. 1 (for example). When the end of the cross-brace post member 35 then is inserted into the opening in the socket 50, the assembled orientation of the various parts is as shown in FIG. 19. The tongue on the socket 50 is slip-fit into the slot 42, and the cross-brace post member 35 is slip-fit into the opening in the socket 50. No welding of parts is necessary nor are fasteners, such as bolts, required.

On the opposite end of the cross-brace post member 35, the interconnection of the parts is made in a similar manner. On the opposite end, however, the brace socket 50 is rotated 180° from the position shown in FIGS. 5, 6, 16 and 18 to insert the tongue into the top of the corresponding slot 45 on the side of the collar 30 located near the bottom of the post 13 (FIG. 1). The orientation for the upwardly extending opening in the brace socket 50 to receive the opposite end of the cross-brace member 35 readily may be ascertained simply by turning FIGS. 18 and 19 upside down to view the manner in which the cross-brace would extend upwardly from a position near the bottom of any one of the fence posts to complete the brace structure.

FIGS. 7, 8, 20 and 21 illustrate a different version of a brace socket which may be used in place of the one shown in FIGS. 5, 6, 18 and 19. The socket shown in FIGS. 7 and 8 includes a tongue 56 which is comparable to the tongue 51 of the brace socket of FIGS. 5 and 6. A generally triangularly shaped support base 55 then is provided, with a lower surface located at the desired angle to be attained by the cross-brace member 35 in the finished construction. A pair of spaced-apart plates 57 are placed on that surface, and the distance between the plates 57 corresponds substantially to the thickness of the rear leg 24 of the T-post cross-brace post member 35. That rear leg 24 is placed between the plates 57, and these plates are spaced from a pair of similarly spaced projections 59, so that the front face 20 of a T-post may extend between the projections 59 and the plates 57. Any lugs 22 on the front face which may correspond to the location of the space between the projections 59 are inserted between those projections. This orientation, and the manner in which the cross-brace post 35 is held in place by this version, is illustrated in FIGS. 20 and 21.

FIG. 9 shows a variation of a collar 30 which has only a single accessory receiving slot 43 in it. For most cases the structure of FIG. 3 is used since, as it readily apparent, it is capable of receiving brace sockets on all four sides, if desired. One such collar, using brace sockets on three sides is shown attached to the upper end of the post 11 in FIG. 1. For some applications, however, where only a single slot 43 is required, such as for all of the other locations shown in Figures 1 and 2, the structure of FIG. 9 also may be used. In all other respects, the collar 30 of FIG. 9 is identical to the one of FIG. 3 and operates in the same manner.

FIGS. 10, 11, 12, 13 and 14, all show accessories of a type which may be used to adapt a T-post for applications other than as a fence post, if desired. All of these assemblies include a tongue 61, 64, 68, 71 or 77 for insertion into any one of the slots 42 through 45 on the collar 30. The device of FIG. 10 has a U-shaped upwardly facing portion 60 which may be used to hold a two by four (2×4) board or other elongated member in place. When two fence posts with two of these devices are spaced apart, they may be used to support such a member for any desired use. A similar device is shown in FIG. 11, but the upwardly facing U-shaped slot 63 is narrower for holding sheet material or the like, if desired.

FIG. 12 shows an accessory which includes a hinge pin 67 on a horizontal plate 66. An accesory of this type typically would be used in pairs, with the upper hinge pin 67 pointing downward and the lower hinge pin 67 pointing upward to prevent removal of the gate from the pins once the collars 30 with which this is accessory is associated, are secured in place on the T-post.

FIG. 13 illustrates a pipe holder 70 for use with standard pipe in applications such as pen construction or storage racks. FIG. 14 illustrates a roof support 74 which may be used in shed roof construction and the like. The surface 74 has a hole 75 through it for accomodating a bolt or other fastener, and this surface is angled upwardly from an upwardly extending support plate 73 to which the tongue 77 is attached.

A variety of other accessories may be used with the collars 30 of the invention. For example, animal jump holders, vertical pipe holders, sign holders, board holders (for shelves, benches or tables) and the like. By using the various accesories, many useful devices may be made, including flag or banner supports, pipe and lumber racks, covered seating, sight and sound barriers for construction sites, hot house frames, wind breaks, hunting blinds, picnic tables, louvered shade walls for animals, saw horses, traffic barricades, and shelf units, to name a few.

Typically, all of the various parts of the collar assembly, and the accessories which are shown in FIGS. 5 through 14, are made from aluminum extrusions and cut to length, with the exception of the socket of FIGS. 7 and 8 which is die cast aluminum. In addition, most of the parts also may be manufactured by progressive die forming.

The above descriptions of the preferred embodiments of the invention and the various manners of use and installation are to be considered as illustrative and not as limiting. Various changes and modifications will occur to those skilled in the art without departing from the true scope of the invention, as set forth in the appended claims.

I claim:

1. A post brace system for bracing first and second substantially vertical posts spaced apart a predetermined distance, said system including in combination:

first collar means releasably mounted on said first post;

second collar means releasably mounted on said second post;

rigid cross-brace means having a length at least sufficient to extend across said predetermined distance; and slip-fit means for releasably securing said cross-brace means at opposite ends thereof to said first and second collar means without additional fasteners to cause said cross-brace means to extend between said first and second collar means.

2. The combination according to claim 1 wherein said first and second collar means each have an opening through which the corresponding first and second vertical posts extend; and further including first and second wedge means for releasably securing said first and second collar means to said respective first and second posts when said first and second wedge means are inserted into the openings in said collar means between a portion of the post extending therethrough and the interior surfaces of the openings in said collar means.

3. The combination according to claim 2 further including attachment means on each of said first and second collar means for attachment to said means for releasably securing said cross-brace means.

4. The combination according to claim 3 wherein said attachment means comprises at least one attachment slot formed through said first and second collar means in a plane substantially parallel to the axis of the openings through said collar means.

5. The combination according to claim 4 wherein said slot has a substantially rectangular cross-section, and said means for releasably securing said cross-brace means includes a mating tongue for insertion into said slot.

6. The combination according to claim 5 wherein said first and second vertical posts are "T-posts" having a row of lugs thereon, spaced apart a second predetermined distance; and said first and second collar means each have a length not greater than said second predetermined distance.

7. The combination according to claim 6 wherein said rigid cross-brace means comprises a third "T-Post".

8. The combination according to claim 7 wherein the opening in each of said first and second collar means has a substantially rectangular internal cross-section, at least the diagonal dimension of which is selected to be sufficient to permit said collar to be slideably moved vertically to any desired position along said "T-post".

9. The combination according to claim 8 wherein said first and second collar means have a central axis and are hollow, with substantially rectangular internal and external cross-sections and wherein said at least one attachment slot comprises an attachment slot through said collar means on each side thereof in mutually perpendicular planes, each of which is parallel to the central axis of said collar means.

10. The combination according to claim 9 further including at least a third vertical post and a third collar means releasably mounted thereon; a second rigid cross-brace means; and further means for releasably securing said second cross-brace means at opposite ends thereof to said second and third collar means to extend therebetween.

11. The combination according to claim 1 wherein said first and second vertical posts are "T-posts" having a row of lugs thereon, spaced apart a second predetermined distance; and said first and second collar means each have a length not greater than said second predetermined distance.

12. The combination according to claim 11 wherein said first and second collar means each have an opening through which the corresponding first and second vertical posts extend; and further including first and second wedge means for releasably securing said first and second collar means to said respective first and second posts when said first and second wedge means are inserted into the openings in said collar means between a portion of the posts extending therethrough and the interior surfaces of the openings in said collar means.

13. The combination according to claim 12 wherein said rigid cross-brace means comprise a third "T-post".

14. The combination according to claim 1 wherein said cross-brace means comprises a cross-brace member having first and second ends and having a length greater than said predetermined distance, wherein the vertical locations of said first and second collar means on said first and second posts, respectively, are at different heights with respect to a horizontal line of reference.

15. The combination according to claim 14 wherein said first and second collar means each have an opening through which the corresponding first and second vertical posts extend; and further including first and second wedge means for releasably securing said first and second collar means to said respective first and second posts when said first and second wedge means are inserted into the openings in said collar means between a portion of the posts extending therethrough and the interior surfaces of the openings in said collar means.

16. The combination according to claim 15 wherein said first and second vertical posts are "T-posts" having a row of lugs thereon, spaced apart a second predetermined distance; and said first and second collar means each have a length not greater than said second predetermined distance.

17. The combination according to claim 1 further including attachment means on each of said first and second collar means for attachment to said means for releasably securing said cross-brace means.

18. The combination according to claim 17 wherein said attachment means comprises at least one attachment slot formed through said first and second collar means in a plane substantially parallel to the axis of the openings through said collar means.

19. The combination according to claim 18 wherein said slot has a substantially rectangular cross-section, and said means for releasably securing said cross-brace means includes a mating tongue for insertion into said slot.

20. The combination according to claim 1 further including at least a third vertical post and a third collar means releasably mounted thereon; a second rigid cross-brace means; and further means for releasably securing said second cross-brace means at opposite ends thereof to said second and third collar means to extend therebetween.

21. A mounting collar assembly for attachment to a fence T-post includes in combination:
   a hollow collar member having a predetermined length and having a substantially rectangular internal cross-section dimensioned in at least the diagonal thereof to slideably fit over a fence T-post;
   slip-fit attachment means on said collar member for attachment of accessories thereto without additional fasteners; and
   wedge means for insertion between the fence post and the collar interior, said wedge means having a cam surface thereon and adapted to be driven between the collar interior and said fence post to secure said collar member to said fence post.

22. The combination according to claim 21 wherein said slip-fit attchment means comprises a plurality of slots formed in said collar member parallel to the length thereof.

23. A mounting collar assembly for attachment to a fence post includes in combination:
   a hollow collar member having a predetermined length and having the interior thereof dimensioned to loosely fit over a fence post, the external configuration of said collar member comprising four mutually perpendicular sides with slots parallel to the length of said member extending at least partially into said member from at least one end thereof on each of said sides; and
   wedge means for insertion between the fence posts and the collar interior, said wedge means having a cam surface thereon and adapted to be driven between the collar interior and said fence post to secure said collar member to said fence post.

24. The combination according to claim 23 wherein said slots extend through the length of said collar member.

* * * * *